US006755441B2

(12) United States Patent
Stenzel et al.

(10) Patent No.: US 6,755,441 B2

(45) Date of Patent: Jun. 29, 2004

(54) MACHINE DETECTABLE DOCUMENT OF VALUE

(75) Inventors: Gerhard Stenzel, Germering (DE); Wittich Kaule, Emmering (DE)

(73) Assignee: Giesecke & De Vrient GmbH, Munich (DE)

( * ) Notice: Subject to any disclaimer, the term of this patent is extended or adjusted under 35 U.S.C. 154(b) by 0 days.

(21) Appl. No.: 10/342,374

(22) Filed: Jan. 15, 2003

(65) Prior Publication Data

US 2003/0102662 A1 Jun. 5, 2003

Related U.S. Application Data

(62) Division of application No. 09/355,330, filed on Nov. 22, 1999, now Pat. No. 6,530,602.

(30) Foreign Application Priority Data

Feb. 3, 1997 (DE) ........................................ 197 03 989
Apr. 8, 1997 (DE) ........................................ 197 14 519

(51) Int. Cl.[7] ................................................ B23B 15/00

(52) U.S. Cl. ........................... 283/70; 283/67; 283/114; 283/91; 283/72; 283/901

(58) Field of Search .............................. 283/72, 82, 83, 283/91, 92, 95, 93, 117, 903, 102; 428/913

(56) References Cited

U.S. PATENT DOCUMENTS

| | | | | | |
|---|---|---|---|---|---|
| 4,227,719 | A | | 10/1980 | McElligott et al. | |
| 4,227,720 | A | | 10/1980 | Mowry, Jr. et al. | |
| 4,307,899 | A | | 12/1981 | Hoppe | |
| 5,171,040 | A | | 12/1992 | Orndorff | |
| 5,483,602 | A | | 1/1996 | Stenzel et al. | |
| 5,547,501 | A | * | 8/1996 | Maruyama et al. | 106/21 R |
| 5,900,954 | A | * | 5/1999 | Katz et al. | 359/2 |
| 5,986,651 | A | * | 11/1999 | Reber et al. | 345/35 |
| 6,138,913 | A | * | 10/2000 | Cyr et al. | 235/468 |
| 6,183,018 | B1 | | 2/2001 | Braun et al. | |
| 6,357,799 | B1 | * | 3/2002 | Shibata et al. | 283/91 |
| 6,612,500 | B2 | * | 9/2003 | Myer, Sr. | 235/493 |

FOREIGN PATENT DOCUMENTS

| | | |
|---|---|---|
| DE | 25 29 328 | 1/1977 |
| DE | 29 09 731 | 9/1979 |
| DE | 41 14 732 | 11/1992 |
| GB | 2095822 | 10/1982 |
| GB | 2287674 | 9/1995 |

* cited by examiner

*Primary Examiner*—Willmon Fridie, Jr.
(74) *Attorney, Agent, or Firm*—Bacon & Thomas, PLLC

(57) ABSTRACT

The invention relates to a document of value consisting of a substrate of predetermined surface area with a printed image visible to the naked eye and a marking in the form of characters, patterns or the like at least partly superimposed on the printed image. The marking is represented by a feature substance having at least one mechanically detectable physical property and extends over the predominant part of the surface of the document. The marking additionally has a given measurable regularity which makes it possible, by mechanical scanning of the marking, to detect the correctness of the distribution and recognize gaps or added partial elements of other authentic documents as disturbances.

10 Claims, 3 Drawing Sheets

MACHINE DETECTABLE DOCUMENT OF VALUE

Figure 1:
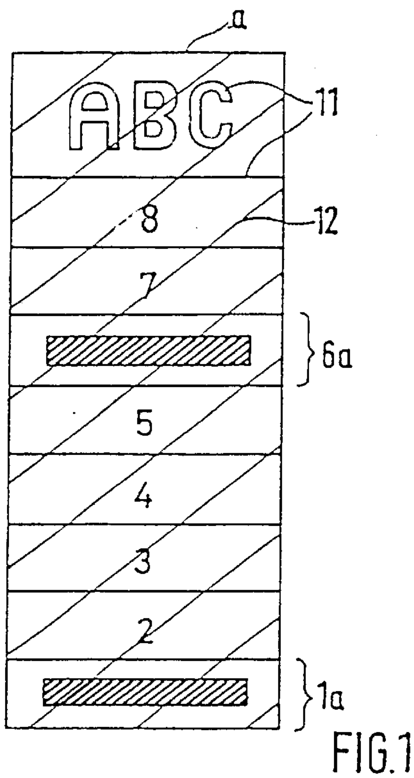

This application is a division of application Ser. No. 09/355,330, filed Nov. 22, 1999 now U.S. Pat. No. 6,530,602.

BACKGROUND OF THE INVENTION

This invention relates to a document of value consisting of a substrate of predetermined surface area with a printed image visible to the naked eye and a marking in the form of characters, patterns or the like at least partly superimposed on the printed image, said marking having a given regularity which allows manipulations of the document to be recognized. The term "document of value" will be used in the following text as a general term for all kinds of documents of value, i.e. vouchers, tickets, identity cards, bank notes, securities, shares and the like.

Vouchers or tickets to be used for several events, such as public transport tickets to be used for several journeys, usually consist of a strip-shaped paper carrier divided into a plurality of likewise strip-shaped fields. One field corresponds to a certain amount of money. The fare for using public transport is frequently a multiple of this amount so that the money value of several fields is required for one journey. In order not to have to cancel each field singly, it suffices in known systems to cancel the last field, in the given order, of the fields to be canceled. The fields therebefore which are not directly canceled are thereby deemed canceled as well. This procedure means that in completely canceled tickets some of the single fields are always uncanceled. If these fields are cut out of different canceled tickets, they can be assembled into an apparently new, unused ticket.

In order to prevent such forgeries it has been proposed in DE 32 16 485 C1 to subject the tickets during production to an additional printing operation in which a continuous wave-line pattern is applied to the tickets. This is done on the paper web before it is cut into the individual tickets. For the additional printing operation one uses a printing cylinder whose circumference is a nonintegral multiple of the ticket length so that the wave-line pattern extending continually within a ticket is somewhat offset from the wave-line pattern of the next ticket. This prevents uncanceled fields from being indiscriminately lined up since the wave line normally has discontinuities at the transitions between fields due to the different tickets. To simulate an authentic ticket a potential forger would thus have to make sure the wave lines of the individual fields join up seamlessly. There is little probability of a forger having the suitable fields available.

However, the advantages of the method known from DE 32 16 485 C1 are only effective in the case of a visual check. If such security patterns are to be tested by machine this would require an effort in measurement technology which is unjustified in many cases, since it would involve elaborate calculating processes making the method uneconomical for many applications.

The invention is therefore based on the problem of providing a document of value whose authenticity and intactness can be tested relatively simply by machine.

The solution to this problem results from the machine-readable features of the present invention, including several different embodiments.

SUMMARY OF THE INVENTION

The invention starts out from the basic idea that one can recognize forgeries and specific falsifications of documents by testing the presence and defined distribution of machine readable feature substances preferably unrecognizable without technical aids. The assembly of new authentic documents from fragments of different authentic documents is additionally impeded if the distribution on the document is effected in coded form and the coded information is varied at a sufficiently low repetition rate from document to document of a series of documents and/or from partial area to partial area of a document. The control information of the documents is checked either via defined mathematical relations or with reference to data records stored in specific data bases.

According to the invention the document of value has a marking represented by means of a feature substance and extending over the predominant part of the document in order to permit not only the authenticity of the document but also the completeness of the document material to be machine readable. The distribution of the feature substance over the surface of the document makes gaps or added partial elements of other authentic documents recognizable as disturbances.

It is known from the prior art to provide documents of value with feature substances to permit their authenticity to be detected by a machine (U.S. Pat. No. 4,255,652). However, the feature substance is not applied here so as to extend over the total or the predominant part of the surface, so that it is possible to manipulate unmarked areas or replace them by forgeries. In addition, all documents of a series have the same marking so that manipulations by combining partial elements of authentic documents of a series are unrecognizable as long as the visible printed image is retained.

In a preferred embodiment, the document of value consists of a strip-shaped paper carrier subdivided into likewise strip-shaped funds-equivalent partial areas preferably extending transversely to the longitudinal extension of the document. These partial area are defined by a printed image visible to the naked eye. Moreover, the document has a linearly executed marking consisting of a machine readable feature substance preferably invisible when viewed without aids, said marking being at least partly superimposed on the visible printed image and extending over the predominant part of the document. These marking lines preferably extend obliquely to the cancelable funds-equivalent strips given by the normal printed image and constitute a coding.

When the document of value is checked, the authenticity of the document material can be detected via the presence of the right feature substance. The coding contents additionally permit inferences to be drawn about the completeness of the document material. If the read information on a document to be tested does not match the given coded information, this indicates that parts of the original document are either completely lacking or were replaced by forgeries or parts of other authentic documents.

The coding moreover offers the advantage that a large amount of testable information can be stored. Thus, the coding can contain for example information on the nature or the intended use of the document, which can be of benefit for swift machine processing of the documents.

In the above-described embodiment, the information contained in the coding is the same for all partial areas. According to a further embodiment, it is also possible to provide groups of partial areas or each individual partial area with a different coding. However, at least the codings of adjacent partial areas preferably have a mathematical relationship to each other. In this case the marking is composed of a plurality of different information parts, which further heightens the protection from forgery since it increases the effort a potential forger must expend in order to successfully combine parts of other authentic documents with the document being manipulated.

Additional protection from forgery arises if the marking varies from document to document at least at a certain repetition rate. During production of documents of value in endless format this can be effected in a very simple way by applying the marking or machine-readable feature substance with the aid of a special printing cylinder whose circumference corresponds to a nonintegral multiple of the document extension, the repetition rate being determinable via the circumference of the cylinder. This permits the content or form of the marking to be identical for all documents, while the offset produces an individualization via the position of the feature substance at least for a series of consecutive documents.

In order to attain the same goal in sheet printing one must produce a plurality of printing plates, depending on the desired repetition rate, which are provided in the area of each copy with a marking pattern offset from the preceding copy. Alternatively it is of course also possible to predetermine a plurality of different marking patterns so that a more or less low repetition rate occurs depending on the number of given marking patterns.

Machine reading of the inventive documents of value is preferably done in two stages. In a first step one can check whether the printed image visible to the naked eye corresponds to that of an authentic document. This can be done with the aid of known pattern recognition methods by comparing the scanned printed image with a reference pattern stored in the machine. If there is no agreement between printed image and reference pattern, the document is rejected. If comparison is positive, the document is scanned in a second step with a sensor sensitive to the particular physical property of the feature substance, and the distribution of the feature substance on the document detected. The document can be scanned all over or only along a predetermined characteristic measuring track. The detected signal permits inferences to be drawn about the authenticity and completeness of the document. If no signal corresponding to the given feature substance was detected at any place on the document, it is a total forgery, for example the color copy of an original document. Otherwise one has a document at least partly consisting of authentic document material.

If the measuring signal additionally reflects the given arrangement of the feature substance, the document consists of authentic document material which was not manipulated. In this case one has an original document. If the measuring signal contains jumps or discontinuities which do not match the original marking, the document is manipulated. If for example whole areas of the original marking pattern are totally lacking, a part of the document was replaced by a false area, for example one produced by color copying. However, if some areas of the line pattern are lacking in the scanning signal and additional signals occur at unexpected places, this is a sign that a plurality of authentic documents were combined into a forgery which would have been classified as an original document when viewed strictly visually.

However, the visible printed pattern and the machine-readable feature substance also can be checked simultaneously or as a function of each other. For example, one can check whether there is a given correlation between certain printed patterns of the printed image visible to the naked eye and the distribution of the feature substance.

Feature substances that can be used are luminescent, electroconductive, magnetic substances or substances with other mechanically testable properties. However, the machine-readable feature substance is preferably selected so as not to appear visually. That is, one uses substances which either are transparent in the visible spectral region or have a body color corresponding to the background. In this case the marking is advantageously disposed under the printed image visible to the naked eye. However, it is also conceivable to use a machine-readable feature substance with a special body color and integrate it into the visible printed image.

The machine-readable feature substance can be applied for example by usual printing processes, the feature substance serving as the colorant either alone or together with other coloring pigments. The machine-readable feature substance need of course not necessarily be applied linearly. The machine-readable feature substance can also be distributed according to a given mathematical algorithm. Alternatively, it is also possible to apply the machine-readable feature substance as a binary code or in the form of a special pattern. Alternatively, the coding or pattern can also be disposed on the document several times.

Figure 2:
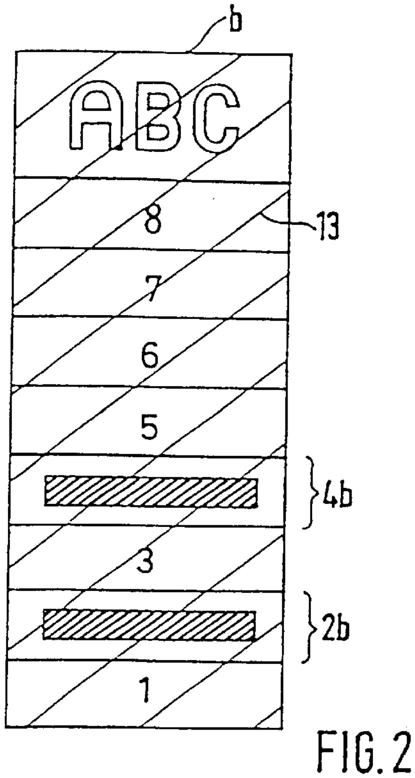
Figure 3:
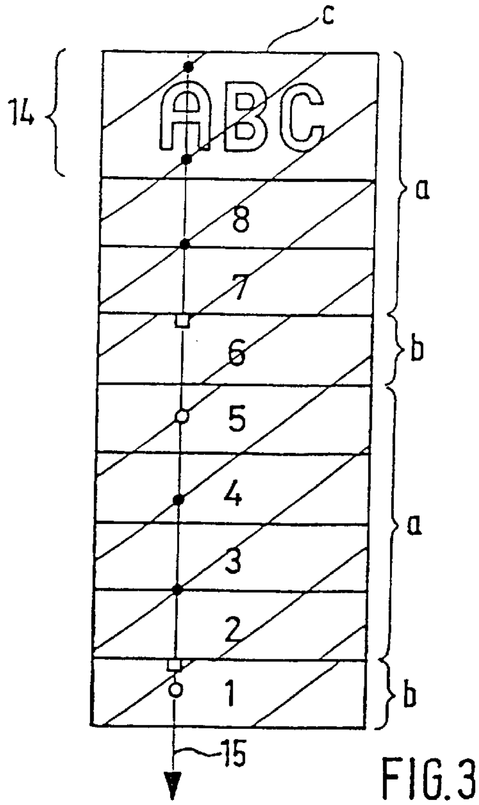
Figure 4:
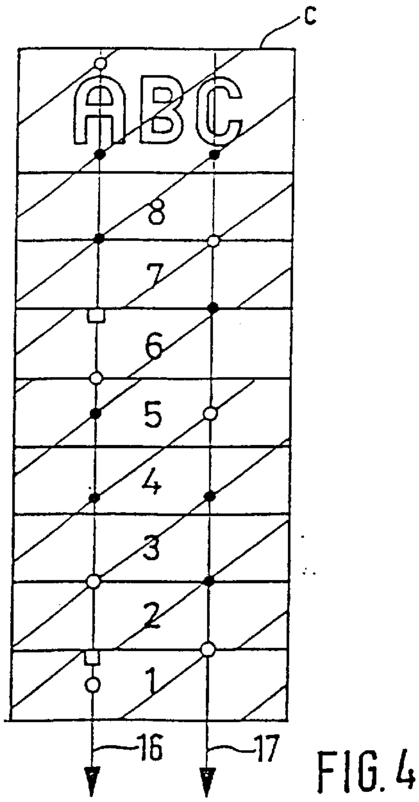
Figure 5:
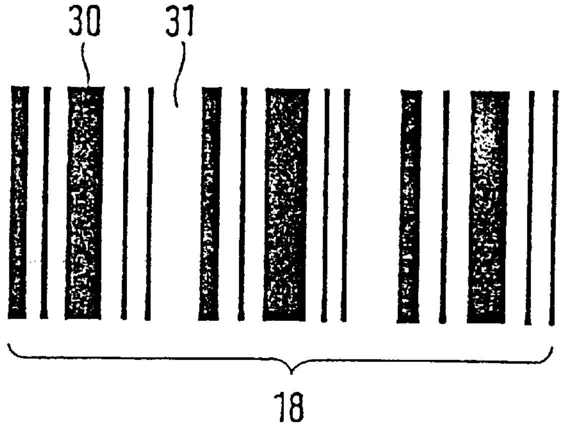
Figure 6:
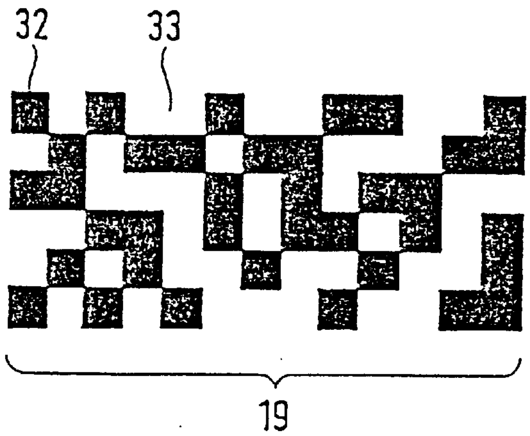
Figure 7:
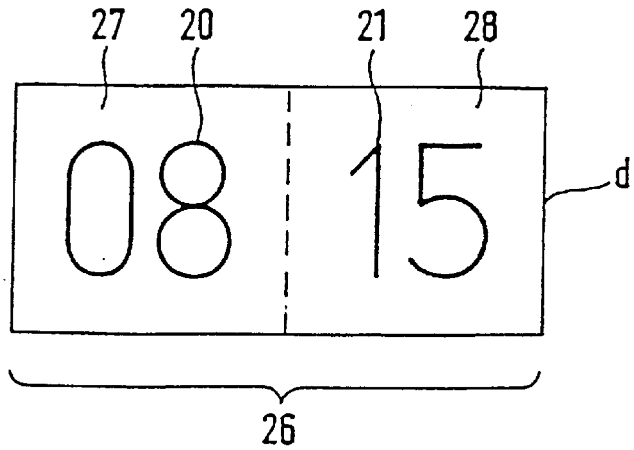
Figure 8:
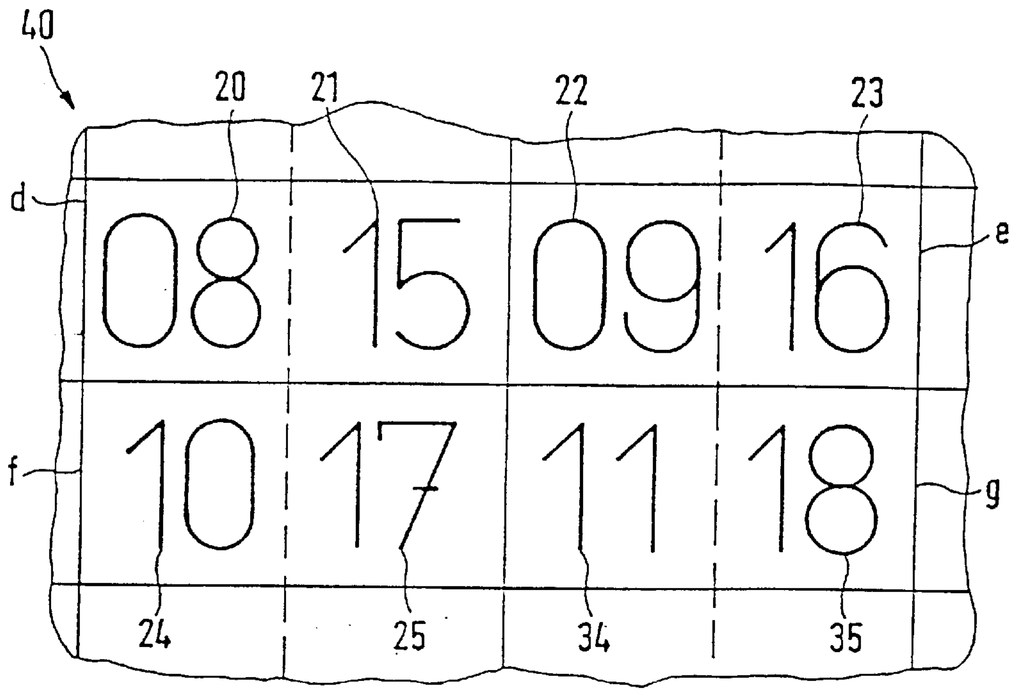
Figure 9:
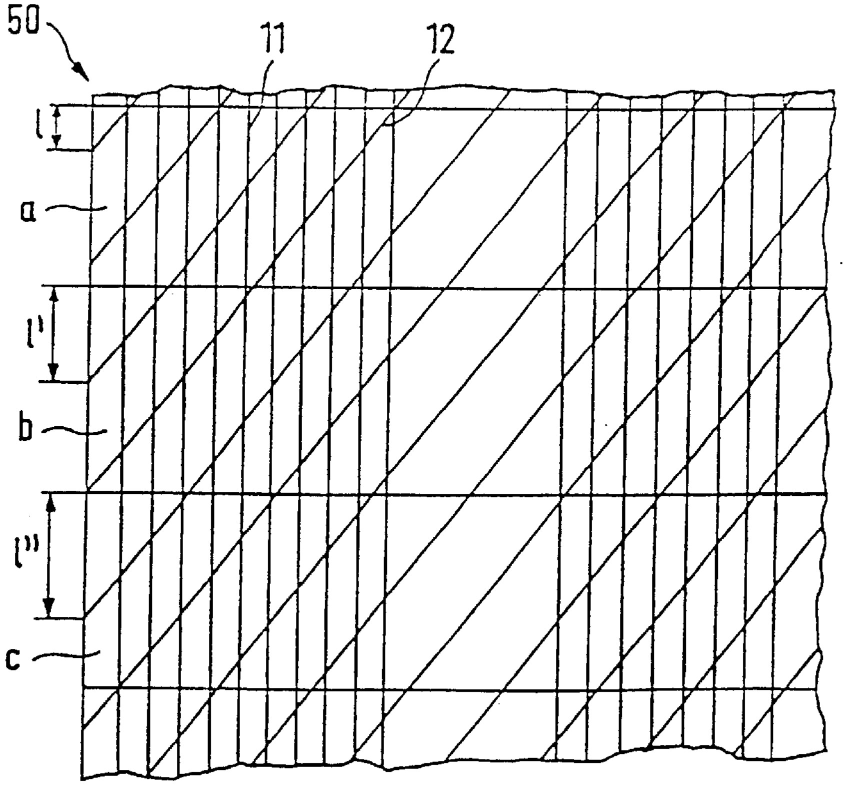

Further embodiments and advantages of the invention will be explained with reference to the figures, in which:

FIG. 1 shows an embodiment of an inventive original document of value,

FIG. 2 shows a further embodiment of an inventive original document of value, FIG. 3 shows a forgery assembled from the documents of value of FIGS. 1 and 2, FIG. 4 shows a forgery with a plurality of measuring tracks, FIG. 5 shows an embodiment of a coding, FIG. 6 shows an embodiment of a coding, FIG. 7 shows an embodiment of a coding, FIG. 8 shows an inventive document-of-value material in sheet format, FIG. 9 shows an inventive document-of-value material in endless format.

FIG. 1 shows a document of value according to the invention. It is multi-use ticket a consisting of a paper or plastic substrate in the form of a strip. On the substrate there is print 11 visible to the naked eye. This may be for instance a background pattern or details about the issuing institute. At the same time, print 11 serves to subdivide ticket strip a in the longitudinal direction into fields 1 to 8 extending over the total width of ticket a. Fields 1 to 8 correspond to a certain amount of money and are canceled in accordance with the fare upon use of ticket a. When canceling, one must keep to a certain order of the strips. Ticket a shown was used twice for example. The fare for the first journey corresponded to the amount of money of one field so that only field 1 was canceled. The fare for the second journey was five times the amount of money represented by a field. The next five fields 2 to 6 were therefore to be canceled. So as not to have to cancel each field singly, it usually suffices to cancel the last field of the fields to be canceled, here field 6. Fields 2 to 5 located between fields 1 and 6 are likewise deemed canceled. Fields 7, 8 can be used for further journeys.

Document a has not only visible printed image 11 but also marking 12 represented by means of a feature substance with a certain machine readable physical property. These can be substances with special optical, electric or magnetic properties. One preferably uses substances which are transparent in the visible spectral region and luminescent and/or absorbent outside the visible spectral region. According to FIG. 1, marking 12 consists of equidistant strips extending over the total document surface and disposed obliquely relative to the running direction of document a.

FIG. 2 shows document of value b not differing from document a in its appearance visible to the naked eye. Only, marking 13 is offset from marking 12. That is, the line spacing of marking 13 is the same but the starting point of the lines is offset. In addition, funds-equivalent strips 1 to 4 were canceled in this case.

FIG. 3 shows forgery c which might result from a combination of the uncanceled strips of documents a and b. Uncanceled strips 2 to 5, 7, 8 of document a were combined here with strips 1, 6 of document b to form complete ticket c whose visual impression is indistinguishable from an original document. However, markings 12, 13 of documents a and b do not complement each other to form continuous, equidistant lines, so that discontinuities will occur in the measuring signal along measuring track 15 upon a machine check of document c. Each point of intersection between measuring track 15 and markings 12, 13 results in a measuring signal. If measurement begins at the upper end of document c, the apparatus detects a signal from the feature substance, as marked in FIG. 3 with a solid dot, at regular intervals up to strip 7. The same applies to strips 2 to 5. These signals come from the material of document a. In field 6, which was taken from document b, no signal occurs at the place where a signal would be expected in accordance with preceding fields 8 and 7, as indicated by a circle. Instead, a signal occurs at another place, as shown by a solid square. The same applies to field 1.

This measuring result can be obtained in different ways. Thus, the signal clock can be known. In this case one could define leading area 14 of for example two clocks in which the measuring clock is adjusted. In the following area the measured values must appear in a certain time window. If measured values are lacking the document is classified as "false".

However, one must take into account here the cancellation which can also exist in original documents. It can be designed so as not to impair the measured values of the markings, by using for cancellation a printing ink which does not have, and does not disturb, the physical property to be measured in the feature substance. If the testing apparatus is also to detect which fields have been canceled or are still cancelable, this can be done with a separate sensor which responds to a certain property of the ink used for cancellation. This property can likewise be any one desired.

Alternatively, it is possible to determine canceled strips and validity of the document of value in one measuring process. This can be done e.g. if cancellation attenuates the feature signal and differentiation is performed by means of different sound values of the testing apparatus.

The interval of the individual measuring clocks need not be constant, however, but can be varied at will. For example its course can be sinusoidal or follow another mathematical law.

In case no visual check of the document is performed and the testing apparatus must also ensure that visible printed image 11 is correct, one can also provide two measuring tracks 16, 17, as shown in FIG. 4. It is conceivable that forgeries occur which are not oriented by the visual appearance of the document but by the additional marking. That is, a forger knows the course of the marking and joins up the different document parts such that the marking corresponds to an original document. In this case the sensor could not recognize a deviation in the measuring signal of the feature substance and the document would be classified as "authentic". In the printed image visible to the naked eye, however, there would be discontinuities and falsifications in the printed pattern.

According to the example shown in FIG. 4, the testing apparatus detects along measuring track 17 the course of the printed transverse strips defining fields 1 to 8. If the strips are located at the same given interval the visible printed image of the document is in order. Otherwise the document is likewise classified as "false". This measuring result can be logically combined with the measuring result of measuring track 16 in order to ascertain whether the document is actually authentic or false.

The marking can of course also have any other form and have a design as complicated as one pleases. FIGS. 5 to 7 show examples of such markings.

FIG. 5 shows marking 18 in the form of a bar code composed of bars 30 of different widths which are represented by the machine-readable feature substance and separated from each other by intermediate areas 31 free from feature substance. Each space 31 and each machine-readable feature strip 30 usually contribute to the representation of information. A certain number of elements, for example eight or eleven elements, represent a numeral between 0 and 9. It is of course also possible to use any other desired codes of this kind.

FIG. 6 shows a further example of a marking. The document area to be provided with marking 19 is subdivided into individual, equally large partial areas 32, 33 which are, or are not, provided with machine-readable feature substance in accordance with a given pattern and thus define logic states "0" and "1". In FIG. 6, partial areas 32 are the areas provided with machine-readable feature substance while partial areas 33 remain uncoated.

FIG. 7 shows schematically the case that marking 26 is composed of a plurality of information parts 20, 21. Here, too, the document is subdivided into partial areas. FIG. 7 shows two adjacent partial areas 27, 28 which, in the simplest form, already yield total document d, but can also be part of a more extensive document.

Information parts 20, 21 can be applied in uncoded form and join up-in content to form total information, i.e. part 20 of the total information is disposed in first partial area 27 of the document while second part 21 of the total information is provided in adjacent partial area 28. According to a more elaborate and forgery-proof embodiment, there is a given regularity between information parts 20, 21. This relation between information parts 20, 21 can be predetermined arbitrarily and stored in a data base for testing or be of a mathematical nature. In the latter case one can calculate one information part from the other information part by a predetermined algorithm. Several partial areas or information parts can of course also join up to form total information of the stated kind.

Alternatively, it is finally also possible to design the coding as a code word or simple pattern which is provided on the document several times. Preferably, this code word or pattern is disposed in a continuous sequence on the predominant part of the document.

The marking can additionally vary from document to document to increase the protection from forgery. Maximum protection is of course obtained if each document of a series, for example all tickets of a certain transport association, has a different marking from document to document. In view of the often very high piece numbers of a series and the resulting high cost for individualizing each individual document of this series, however, it is usually sufficient to provide an appropriate repetition rate for the marking.

For realization in sheet printing one can for this purpose produce for example a plurality of printing plates having a different marking in the area of each copy.

FIG. 8 shows a detail of substrate sheet 40. One can see four copies d, e, f, g of a document which are each provided with a different marking. The markings are composed in each case of two information parts (20, 21), (22, 23), (24, 25) and (34, 35), as explained above with reference to FIG. 7.

FIG. 9 shows a detail of endless substrate material 50. Copies a, b, c shown here have visually recognizable printed image 11 besides marking 12. Marking 12 consists here, as explained above in FIG. 1, of equidistant strips represented by means of the machine-readable feature substance. The machine-readable feature substance was transferred with the aid of a printing cylinder whose circumference corresponds to a nonintegral multiple of printed image 11. For this reason marking 12 is offset from document to document relative to printed image 11 or the later edges of single documents a, b, c. In FIG. 9 this is indicated by different lengths l, l' and l". The marking of a document composed of individual parts of said documents a, b, c would therefore have machine readable jumps and discontinuities, as explained above with reference to FIG. 3.

According to a special embodiment, the marking can also be visible to the naked eye, i.e. the machine-readable feature substance used can itself have a body color or be admixed to a printing ink visible to the naked eye. In this case the marking is preferably provided only in the area of visible printed pattern 10 in order to be additionally protected from discovery. Alternatively or additionally, the areas not provided with machine-readable feature substance can have an additional coating which conveys the same optical impression as the feature substance or has the same chemical properties, but without having the physical property to be measured.

During production of the inventive document of value one provides a substrate material either in endless form or in sheet form in a first step. One applies the marking and the visible printed image to this substrate material in consecutive operations, preferably applying the marking to the substrate material before the visible printed image. In this case one provides the substrate material partly with the machine-readable feature substance in a second step, resulting in a marking which extends over the predominant part of the substrate material. Finally, one prints the visible printed image at least overlapping this marking, and divides the substrate material into separate single documents.

The substrate material can be not only paper or cardboard but also plastic or a mixture of natural and synthetic fibers. Document a to be protected can be not only a ticket but any other document that is to be machine readable for authenticity and intactness. In other areas there is also the danger of forgeries being in circulation which are for example composed of authentic document parts and copied parts. This can apply e.g. to checks, admission tickets, bank notes or the like.

What is claimed is:

1. A method for producing a document of value comprising a substrate of predetermined surface area with a printed image visible to the naked eye and a marking in the form of characters, or patterns having a given regularity permitting manipulations of the document of value to be recognized, the method comprising the steps of:

providing a substrate material;

distributing a feature substance partly over said substrate material resulting in a marking composed of a plurality of information parts and provided in the predominant part of the surface of the substrate material, the feature substance of the marking having at least one machine detectable physical property and not appearing visually on the document; and printing the printed image visible to the naked eye so as to at least overlap said marking.

2. A method according to claim 1, wherein the feature substance is printed in the form of a defined structure or coding.

3. A method according to claim 2, wherein the defined structure or coding is provided on the substrate material several times.

4. A method according to claim 1, wherein paper is used as the substrate material.

5. A method according to claim 1, wherein the circumference of a printing cylinder for applying the defined structure to the substrate deviates from the circumference of a printing cylinder for printing the visible printed image of the document, resulting in an offset between printed image and security structure, which extends over a plurality of documents.

6. A method for producing a document-of-value material including a substrate of predetermined surface area with a marking having a given regularity permitting manipulations of the document of value to be recognized, the method comprising the following steps of:

providing a substrate material;

distributing a feature substance partly over said substrate material resulting in a marking composed of a plurality of information parts and provided in the predominant part of the surface of the substrate material, the feature substance of the marking having at least one machine detectable physical property and not appearing visually on the document; and printing the printed image visible to the naked eye so as to at least overlap said marking.

7. A method according to claim 6, wherein the feature substance is printed in the form of a defined structure or coding.

8. A method according to claim 7, wherein the defined structure or coding is provided on the substrate material several times.

9. A method according to claims 6, wherein paper is used as the substrate material.

10. A method according to claim 6, wherein the circumference of a printing cylinder for applying the defined structure to the substrate deviates from the circumference of a printing cylinder for printing the visible printed image of the document, resulting in an offset between printed image and security structure, which extends over a plurality of documents.

* * * * *